Nov. 4, 1958          D. L. BATTEN          2,858,774
AIRCRAFT TRACK AND PALLET LOADING SYSTEM AND APPARATUS
Filed Sept. 9, 1955          5 Sheets-Sheet 1
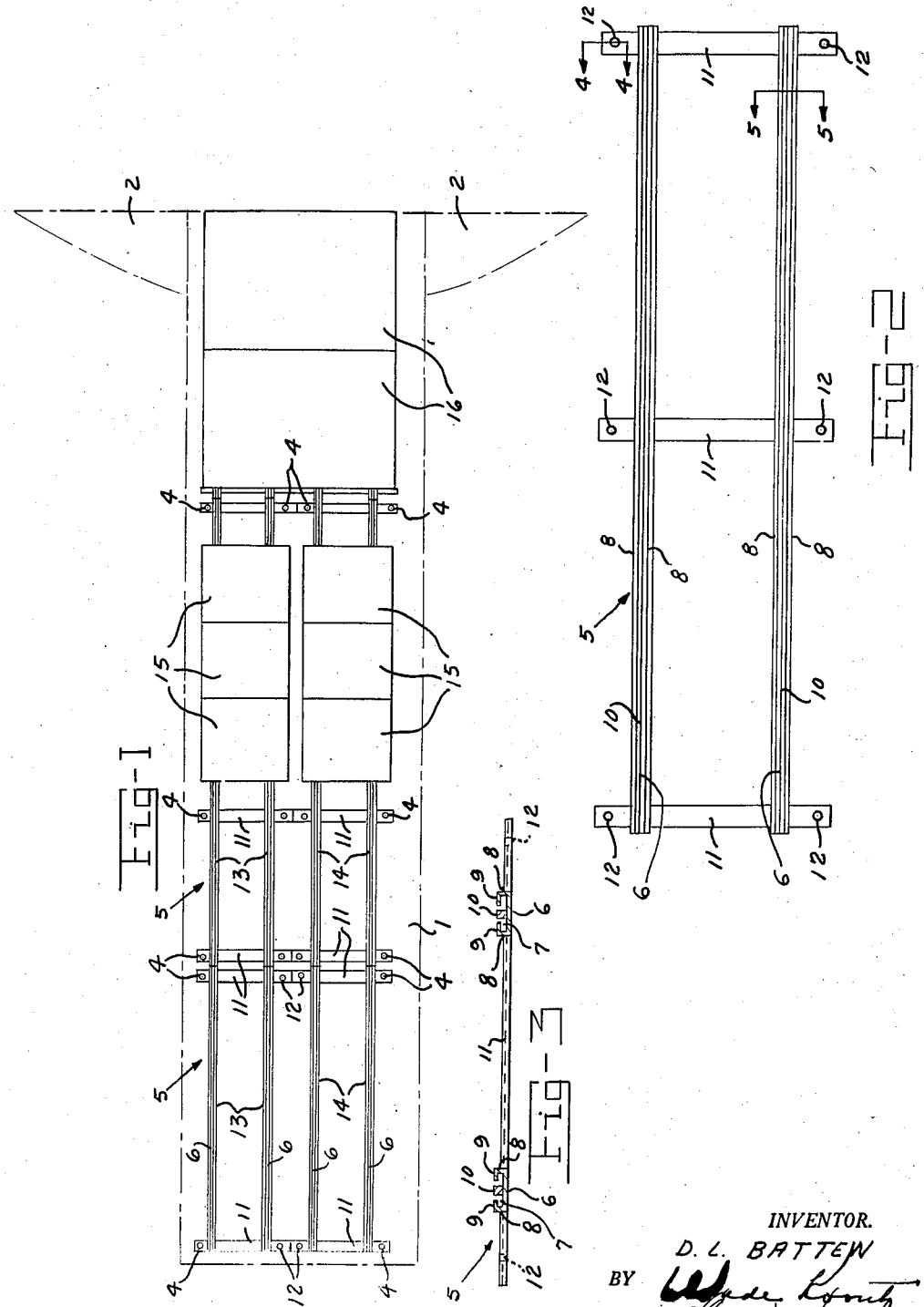
INVENTOR.
D. L. BATTEN
BY
ATTORNEYS Nov. 4, 1958          D. L. BATTEN          2,858,774

AIRCRAFT TRACK AND PALLET LOADING SYSTEM AND APPARATUS

Filed Sept. 9, 1955          5 Sheets-Sheet 2

INVENTOR.
D. L. BATTEN

BY
ATTORNEYS

Nov. 4, 1958 D. L. BATTEN 2,858,774
AIRCRAFT TRACK AND PALLET LOADING SYSTEM AND APPARATUS
Filed Sept. 9, 1955 5 Sheets-Sheet 3

INVENTOR.
D. L. BATTEN
BY
ATTORNEYS

Nov. 4, 1958 D. L. BATTEN 2,858,774
AIRCRAFT TRACK AND PALLET LOADING SYSTEM AND APPARATUS
Filed Sept. 9, 1955 5 Sheets-Sheet 4

INVENTOR.
D. L. BATTEN
BY
ATTORNEYS

Nov. 4, 1958 D. L. BATTEN 2,858,774
AIRCRAFT TRACK AND PALLET LOADING SYSTEM AND APPARATUS
Filed Sept. 9, 1955 5 Sheets-Sheet 5

INVENTOR.
D. L. BATTEN
BY
ATTORNEYS

United States Patent Office 2,858,774
Patented Nov. 4, 1958

2,858,774

AIRCRAFT TRACK AND PALLET LOADING SYSTEM AND APPARATUS

Dallas Lee Batten, Bethesda, Md.

Application September 9, 1955, Serial No. 533,534

2 Claims. (Cl. 105—366)

(Granted under Title 35, U. S. Code (1952), sec. 266)

The invention described herein may be manufactured and used by or for the United States Government for governmental purposes without payment to me of any royalty thereon.

This invention relates to a cargo loading and unloading system and apparatus for aircraft, and more particularly to a portable or removable track and pallet system and apparatus for loading and transporting freight and similar cargo by aircraft.

An object of the present invention is the provision of easily assembled track units and holddown system for converting the floor of a cargo airplane into a supporting track system for receiving special wheeled pallets and having cooperating holddown means between the track units and the pallets whereby the pallets are held interengaged with the tracks upon movement of the pallets along the tracks into the aircraft.

A further object includes means for releasably interlocking a plurality of the track units or sections together, end to end, on the floor or cargo supporting deck of the aircraft, including removable means for firmly and positively fastening the track sections to said floor or deck to prevent the shifting movement thereof in any direction during flight.

A further object includes pallets having roller means disposed for supporting and rolling engagement on the rails of the track units, comprising a plurality of supporting legs, each extending above and below the roller means in partially surrounding relation thereto in which the lower ends of the legs are formed to interengage the supporting track means to prevent relative upward movement or lateral displacement of the roller means from the track units and a cargo supporting platform fixed on the upper ends of the legs.

A further object comprises an arrangement in which the legs support the platform in vertically spaced relation to the track system whereby the pallets can be lifted, manipulated, and deposited, to place the rollers on the track in the aircraft by a conventional vertical lift fork type truck with the lower ends of the legs supported in spaced relation to the floor of the aircraft.

A further object includes an entrance or "loading" track section or unit having the leg interengaging means thereof removed, whereby the pallets can be deposited on this unit from above and rolled onto the tracks of the other track units in interlocked relation against sidewise and vertical displacement.

A still further object includes the provision of means on the track sections for interlocking engagement with the conventional cargo tiedown or anchoring means in the floor of the aircraft for fixing the track units or sections on the supporting floor or deck of the cargo aircraft against shifting movement in any direction.

A further object includes the provision of aligning and interlocking means between the ends of the track units or sections for releasably holding the track sections in an end to end alignment during loading, flight and unloading.

A still further object includes the provision of removable and quickly applied chock means for preventing longitudinal movement of the pallets along the rails of the track units after being rolled into predetermined positions for flight thereon, to prevent accidental cargo shifting during flight.

Another object is the provision of improved cargo tiedown connecting means fixed on the pallet for securely retaining cargo on the cargo supporting platforms of the pallets to prevent relative movement between the cargo and pallets during loading, flight and unloading.

Another object includes the provision of collapsible rigid spacing means between the rails of the track sections or units whereby the units are collapsible for storage and shipment, and readily expandable to dispose the rails thereof in parallel spaced relation for positioning on the floor or deck of the cargo aircraft and includes anchoring plates apertured to receive and engage the standard screw-type cargo holddown means for holding the track units firmly in their expanded relation in the aircraft.

Other and further objects and advantages of the invention will readily become apparent from the following description and claims, when taken in conjunction with the accompanying drawings in which like reference characters refer to like parts in the several figures thereof.

Drawings

Figure 1 is a plan view of the aircraft track and pallet loading system and apparatus, showing the supporting floor or deck portion of the cargo aircraft in phantom, a few of the pallets being shown schematically in position on the track units.

Figure 2 is an enlarged plan view of one of the track units.

Figure 3 is an end elevation of one of the track units as seen in Figure 2.

Figure 4:
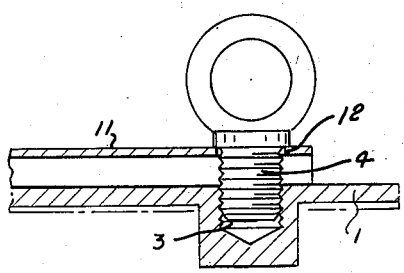
Figure 4 is an enlarged fragmentary vertical sectional view taken about on line 4—4 of Figure 2, showing one of the cargo tiedown means receiving sockets in the deck or floor and one of the tiedown eye bolts screwed therein through one of the apertures in the end of one of the track units for releasably holding the track units in place.

Referring more particularly to Figure 1 the reference numeral 1 denotes the deck, or supporting platform, or floor of a cargo carrying aircraft the entrance opening or door closures being indicated at 2. Located throughout the platform area are a multitude of tiedown or holddown member receiving sockets 3, as seen in Figure 4 which are adapted to receive the holddown members 4. The sockets 3 and members 4 as shown are complementarily threaded although other obvious interlocking means may be provided such as bayonet slot and coupling connections.

My invention comprises a plurality of track sections or units, one of which is shown in Figure 2 and indicated at 5 generally, in its simplest form.

Figure 5:
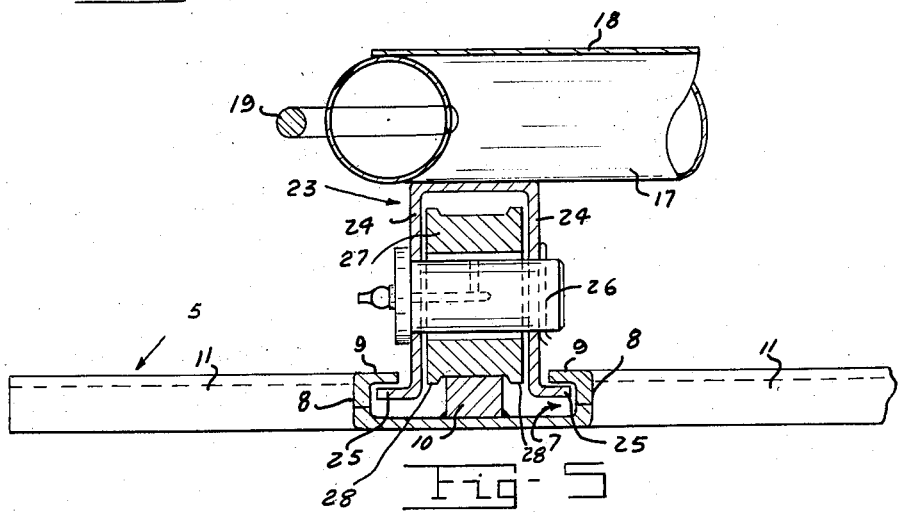
Figure 5 is an enlarged vertical sectional view taken about on the line 5—5 of Figure 2, illustrating a portion of one of the pallets in section and more particularly showing the construction of the track portion of the track units with one of the pallet legs and its roller device in interlocked relation with the track flanges.

The track units or sections 5 each comprise spaced channels 6 designed to rest on the floor 1 of the cargo carrying section of the aircraft. The track units 5, as seen in Figures 2, 3 and 5, each including a pair of channel members 7 with the spaced sides 8 of the channel extending vertically upward, each terminating in horizontally extending top flanges facing each other in spaced relation as seen in Figure 5.

A load carrying solid rail 10 is fixed on the inner surface of the bottom of the channel 7 by any means, such as by welding.

The base of each channel 7 rests on the floor 1 and carries the load and stresses of the pallets and the load thereon during take-off, flight, and landing of the aircraft. The channels 7 are connected together by tie members 11 as seen in Figures 2, 3 and 5, these ties being preferably inverted U-shaped channels which also rest on the floor 1 at their lower edges, preferably being welded to the channel members 7 to provide the integral track units 5.

The ends of the tie members or channels 11 are apertured as at 12 as seen in Figures 2 and 3 to receive the conventional holddown screw fasteners 4, although other interchangeable screw fasteners may be used to secure the track units in place.

The number of assembled track units depends, of course, on the size of the aircraft. Figure 1, however, illustrates a typical cargo aircraft illustrating two tracks 13 and 14 secured in place, each track composed of a plurality of the shorter compact track units 5. In this view a few of the load carrying pallets 15 and 16 are illustrated in position on the tracks 13 and 14.

Figure 11:
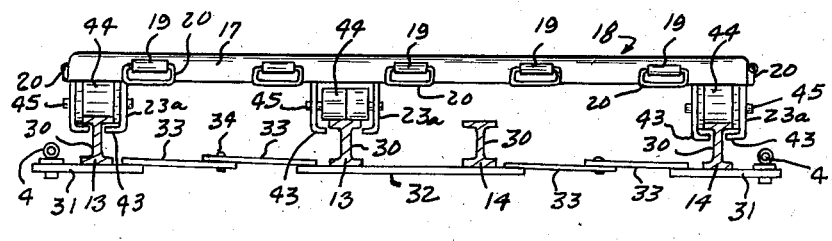
Figure 11 is a transverse sectional view taken about on line 11—11 of Figure 7 illustrating, on a larger scale, in end elevation, one of the larger pallets mounted on the rails of the track units.

The pallets 15 are the smaller or lighter load carrying vehicles, designed to roll on and interlock with one pair of tracks 13 or 14, while the pallets 16 are wider for heavier or larger load capacity and designed to roll on and interlock with more than two rails of the track units, such as shown in Figure 11.

The track units 5 may be made collapsible, as later set forth, and are also provided with self aligning coupling means for rigidly securing the rails thereof in aligned abutting end to end relation.

Figure 6:
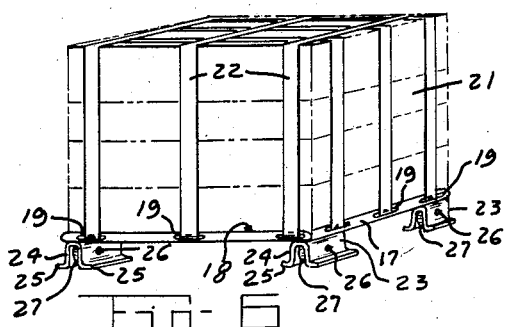
Figure 6 is a perspective view of one of the pallets, showing the same in loaded condition with its load or cargo securely tied down to the platform by transverse tiedown straps.

The pallets 15 and 16 are otherwise similar in construction, as shown in Figures 5, 6, 10 and 11 and preferably comprise a tubular reinforced frame 17 having a cargo or load supporting platform 18. The tubular frame 17 is provided with a plurality of load tiedown brackets 19 which may be rigidly attached, as seen in Figure 5, or provided with D rings 20, as seen in Figure 11. When a load, such as indicated at 21, is placed on the pallet it can be securely tied down on the platform 18 by transverse strap members 22, as illustrated in Figure 6.

Depending from the tubular frame 17 are a plurality of leg members 23, each comprising spaced side plates 24 having their lower extremities flanged outwardly as indicated at 25 to provide supporting feet for supporting the platform 18 and frame 17 in spaced relation above the ground whereby a conventional fork-type lift truck may be utilized to lift the pallet and its load into the aircraft entrance and deposit the same with the side plates 24 straddling the rails 10.

Journalled between the side plates 24 on a shaft or axle 26 is a traction roller or wheel 27 having its opposite edges flanged as at 28 so as to roll on the rail 10 with the side flanges 28 engageable with the opposite sides of the rail as seen in Figure 5. The diameter of the wheels or rollers 27 and position of the axles 26 are such as to dispose the lower edges of the peripheries of the wheels above the outwardly flanged feet 25 and to dispose the outwardly flanged extremities of the plates under the inwardly turned flanges 9 of the channel members 7 when the wheels 27 are riding on the rails 10, thus preventing disengagement of the pallets from the track units once the pallets have been rolled in place on the track units having the inturned flanges 9.

Figure 12:
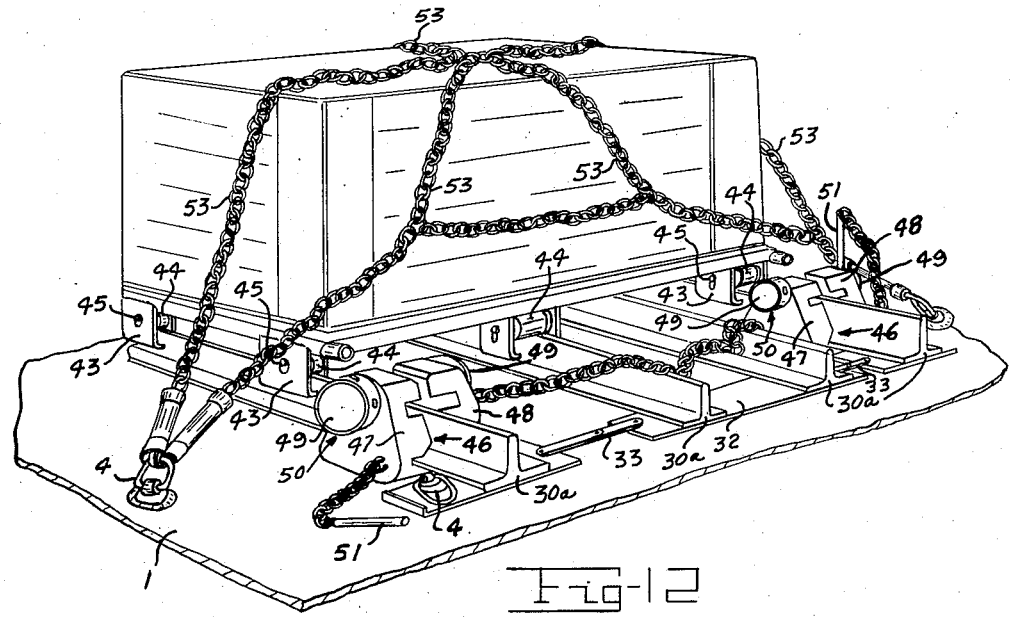
Figure 12 is a perspective view, more particularly illustrating a pair of the chock members or stops clamped in place for retaining the pallets in position against rolling on the tracks during flight.

It is preferable to provide one of the track units 5, or a portion thereof, at the entrance or loading station, as shown in Figure 12, with the retaining or overhanging flanges 9 omitted, thus allowing the pallets to be deposited on these rails of the track units and then rolled onto the rails having the overhanging flanges 9 thereon.

In the form just described the track sections are short, small, strong and light in weight and may be easily taken up by the removal of the threaded "tiedown" fasteners 4, as seen in Figure 4 and nested out of the way for storage when it is desired to use the cargo platform or floor without the track units 5 thereon.

Figures 7, 8, 9 and 10 illustrate slight modifications, both as to the individual track units and as to the co-operating interlocking features between the legs of the pallets and the track rails.

Figure 7:
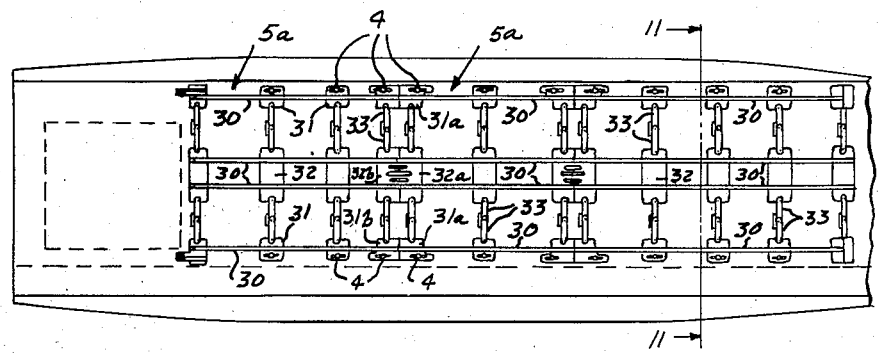
Figure 7 is a plan view of a slightly modified arrangement illustrating a different type of supporting track unit which is collapsible for storage, illustrating the cargo compartment and aerial delivery door in dotted lines.

Referring more particularly to Figures 7 and 11, 30 denotes the rails of the modified track units which are substantially of I-beam shape in cross section, having top and bottom flanges extending in opposite directions away from a vertical web. The rails 30 are fixed directly on top of small rectangular bed central plates 31 and 32, the plates 32 being longer than the end plates 31 so as to support the adjacent rails of the track units. In this form each track unit, indicated at 5$^a$ comprises a pair of tracks, each track comprising a pair of the I beam rails 30. The plates 31 and 32 are collapsibly connected together by link members 33, shown partly collapsed for storage in Figure 9 and expanded for use in Figures 7 and 8. One of the link members 33 of each pair carries a stop plate 34 for limiting the swinging movement of the links to their aligned relations, as shown in Figure 7.

Figure 8:
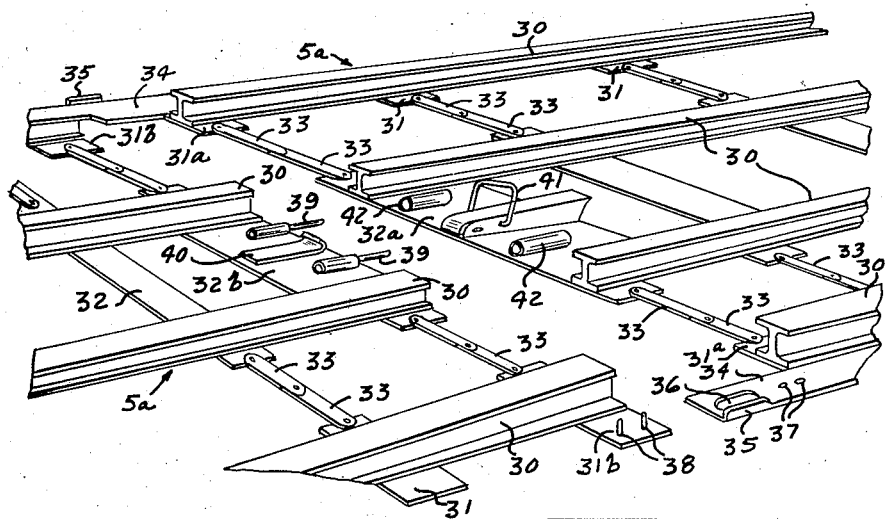
Figure 8 is a fragmentary perspective view, more clearly illustrating the complemental interlocking coupling means between the adjacent ends of two of the track units or sections and the hinge or link coupling means between the rails of the track units.

As best seen in Figure 8, the side plates at each side of the double track units are indicated at 31$^a$ and the central end plates are indicated at 32$^a$. The units have complemental side plates and central plates at their opposite ends as indicated at 31$^b$ for the side plates and at 32$^b$ for the central plates. The end plates 31$^a$ are provided with extension plates 34 having upwardly extending flanges 35 and elongated openings 36 to receive the tiedown bolt fastening members 4 therethrough. The plates 34 are also apertured at 37 to receive a pair of positioning pins 38, upstanding from each of the end plates 31$^b$. The central plates 32$^b$ are provided with laterally spaced longitudinally projecting pins 39, with a hook plate 40 therebetween. The complemental central plates 32$^a$ are provided with a latch member 41 to engage and interlock with the hook plate or member 40 of the next or adjoining unit. The plate 32$^a$ also has longitudinally disposed cylindrical sockets 42 fixed thereto at opposite sides of the latch plate 41 to receive the projecting pins 39 on the complemental central plate 32b.

When the track units 5a, as shown in Figure 8, are brought together as shown in Figure 7 and interlocked in alignment by the pins 39 and 38 and the latches 41 and secured to the floor of the aircraft, a very strong and rigid portable track structure is provided, the track structure being anchored down by the tiedown members 4 screwed through the openings 36 in the plate extensions 34 into the sockets 3 which are provided in the floor or supporting platform 1 of the cargo aircraft.

As mentioned briefly the track rails are of substantial I beam cross section, as best seen in Figure 11, and the legs 23a of the pallets are inwardly flanged toward each other at their extremities to provide supporting feet 43 for supporting the pallet platform above the ground or on a supporting surface to provide for the reception of the "fork" lift of a lift truck.

The inturned feet ride below the upper flanges of the rails and flanged traction rollers 44 and are journalled on the axles 45 with their peripheries located above the feet 43 and their side flanges straddling rails, as shown in Figure 11.

Figure 11 shows one of the larger or wider pallets designed to extend across both pairs of rails and ride on three of the four rails. The smaller pallets 15 only extend across one pair of tracks and are provided with feet and rollers for engagement with that track.

From the above it will be observed that once the pallets are interengaged with the rails the inturned feet hold the pallets down securely on the rails. Since the loads carried by the pallets are securely tied down to the pallet platforms the pallets can be loaded and prepared for shipment outside of the aircraft and no time is lost in securing the load within the airplane. Also, even with heavy loads they can be shifted along the tracks with little effort and comparative ease.

In order to deposit the pallets directly on the tracks, through the delivery door opening by the use of a lift truck or other lift device, one portion of the track units below or adjacent to the door or entrance opening have the top flanges omitted for a distance equal to the width of the largest pallet as best seen in Figure 12, providing inverted T-shape rail portions 30a. The balance of the rails of this double track unit have the top side flanges.

The pallets, either the smaller or larger types, are lowered onto these rails 30a and then rolled onto the I beam portions of the rails of the adjoining track units and are held down by their interlocked relation between their flanged feet and the top flanges of the rails.

A suitable set of chock members 46 is provided, preferably chained to each other, and best seen in Figure 12. The chock members 46 each comprise a pair of clamping blocks 47 and 48 provided with a clamping screw 49. The screw extends through a bore in one of the blocks 47 or 48 and is threaded into the other block 48 or 47. An enlarged head 50 on each of the screws is provided with radial sockets to receive an actuating bar or rod 51, chained at 52 to one of the blocks, for tightening the clamping blocks 47, 48 against the sides of the rails. The adjacent faces of the blocks are channeled to receive the flanges of I beam rails 30 as well as the inverted T shape rails 30a.

Figure 9:
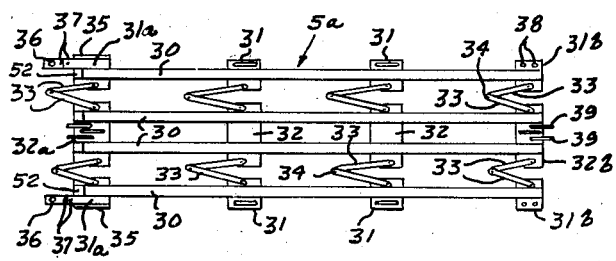
Figure 9 is a somewhat schematic plan view of one of the longer track units, showing the same partly collapsed for storage.
Figure 10:
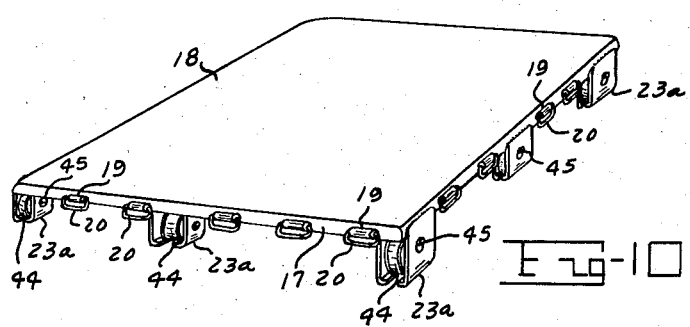
Figure 10 is a perspective view of one of the larger or double size pallets employed for carrying larger or heavier cargos or loads.

When the pallets are in position on the rails the chock blocks are secured to prevent longitudinal movement of the pallets on the rails. The inner ends of the rails at the inner end of the cargo carrying section of the aircraft may each be provided with a fixed or removable abutment 52, as seen in Figure 9.

When the cargo section is "fully loaded" the last deposited pallet or pallets will be deposed on the unflanged track rails 30a and these pallets will necessarily be tied down against displacement, such as by chains and if desired turnbuckles or spring cushion units may be included, as seen in Figure 12. The chains, indicated at 53, including the turnbuckle or cushion units are secured to the tiedown fixtures 4 and passed over the pallets and their cargo as seen in the drawings to hold down the cargo and pallets, while the chocks 46 and 52 prevent longitudinal shifting of the pallets on the track units.

The above arrangement provides a safe, quick and satisfactory method and apparatus for handling, shipping and delivery of heavy freight and cargo by aircraft.

While the invention is described in connection with drawings showing one or more embodiments, for illustrative rather than restrictive purposes, minor changes and modifications may be made therein without departing from the spirit and scope of the invention as defined in the following claims.

I claim:

1. A system for the aerial transportation of cargo on preloaded pallets said individual pallets being standardized in form and size for interchangeability, and use in multiples, the provision for use therewith of a cargo aircraft having a fuselage inclosure shell having a delivery opening and an adjacent cargo receiving compartment for receiving said pallets, the compartment includes a cargo supporting floor having cargo tiedown securing means receiving sockets disposed in spaced parallel rows leading away from said cargo receiving opening and through said compartment, and cargo tiedown securing means removably secured in said sockets, a plurality of interchangeable track units, each comprising spaced parallel rails and transverse tie members apertured to receive said cargo tiedown securing means therethrough to secure said track units on said floor in aligned end-to-end relation, said spaced parallel rails each having oppositely extending pallet holddown flanges extending substantially throughout the length of the track units in parallel relation to the rails at opposite sides thereof, said pallets each comprising a cargo supporting platform having means for securing a cargo thereon against displacement, a plurality of pairs of spaced leg members depending from the opposite sides of the platform to straddle said rails, a roller journalled between each pair of said spaced leg members below the pallet platform with the lower edge of its periphery above the lower extremities of said legs to roll on said rails when moving said pallets in said compartment, oppositely extending flange means projecting laterally from the extremities of each pair of said spaced leg members to ride under said oppositely extending flanges at opposite sides of said rails to limit vertical displacement between said rollers and said rails and form supporting feet for said pallets for supporting said pallets when not disposed on said rails with the pallet platform in vertically spaced relation above a supporting surface therefor.

2. In a track and pallet system for handling and transporting cargo in a cargo airplane having a cargo compartment formed with a cargo receiving and delivery opening and a cargo supporting floor formed with cargo holddown means receiving sockets therein extending in spaced parallel rows from said cargo receiving opening throughout said cargo compartment and cargo holddown means for insertion in said sockets; a plurality of interchangeable track units each comprising spaced parallel rails, transverse tie means connecting the rails together having cargo holddown means receiving openings therein disposed for alignment with said receiving sockets to receive said cargo holddown means for securing said track units on said floor with the rails thereof in aligned end-to-end relation, said rail means having laterally extending inturned flange means extending throughout their lengths in parallel relation along adjacent the sides of said rails, a plurality of cargo supporting pallets each having a cargo supporting platform and cargo retaining means secured on the platform for securing a cargo on said pallets, a plurality of pairs of spaced supporting leg members depending from the pallet supporting platform for supporting the platform in elevated relation to a supporting surface during loading and while in said cargo receiving compartment, said pairs of leg members disposed to straddle said rails at opposite sides of said track units and formed with laterally and outwardly extending flange means at their lower ends to ride under said laterally extending flange means on said rails for vertical movement limiting engagement with said laterally extending flange means on said leg members to retain said pairs of leg members in said rail straddling relation, and a roller journalled between each pair of said leg members for rolling engagement with said rails, the rollers having their peripheries disposed between said pallet cargo supporting platform and said outwardly flanged lower extremities of said pairs of leg members.

References Cited in the file of this patent

UNITED STATES PATENTS

| | | |
|---|---|---|
| 712,587 | Pfunter et al. | Nov. 4, 1902 |
| 923,487 | Buhl | June 1, 1909 |
| 1,072,261 | Riddle | Sept. 2, 1913 |
| 1,247,553 | Linquist et al. | Nov. 20, 1917 |
| 1,350,873 | Lombardo | Aug. 24, 1920 |
| 1,603,393 | Malcolm | Oct. 19, 1926 |
| 2,172,154 | Perin | Sept. 5, 1939 |
| 2,209,881 | Frankman | July 30, 1940 |
| 2,254,607 | Guerrero | Sept. 2, 1941 |
| 2,493,010 | McDonald | Jan. 3, 1950 |
| 2,619,917 | McKee et al. | Dec. 2, 1952 |
| 2,625,118 | Lechner | Jan. 13, 1953 |